(12) United States Patent
Walter (10) Patent No.: US 12,461,957 B1
(45) Date of Patent: Nov. 4, 2025

(54) SYSTEMS AND METHODS FOR ASSESSING CONSISTENCY OF INTERROGATION RESPONSES WITH A RECORD OF FACTS

(71) Applicant: The Simple Associate, Inc., San Rafael, CA (US)

(72) Inventor: Nathan Walter, San Rafael, CA (US)

(73) Assignee: The Simple Associates, Inc., San Rafael, CA (US)

( * ) Notice: Subject to any disclaimer, the term of this patent is extended or adjusted under 35 U.S.C. 154(b) by 0 days.

(21) Appl. No.: 19/171,518

(22) Filed: Apr. 7, 2025

(51) Int. Cl.
*G06F 16/334* (2025.01)
*G06F 16/683* (2019.01)

(52) U.S. Cl.
CPC ........ *G06F 16/3347* (2019.01); *G06F 16/683* (2019.01)

(58) Field of Classification Search
CPC ........................... G06F 16/3347; G06F 16/683
USPC .......................................................... 707/748
See application file for complete search history.

(56) References Cited

U.S. PATENT DOCUMENTS

| | | | |
|---|---|---|---|
| 2021/0350081 A1* | 11/2021 | De Peuter | G06N 20/20 |
| 2024/0273793 A1* | 8/2024 | DeCharms | G09B 5/06 |
| 2024/0296295 A1* | 9/2024 | Russell | G06F 40/56 |
| 2025/0104392 A1* | 3/2025 | Saraee | G06F 16/438 |
| 2025/0124060 A1* | 4/2025 | Hackman | G06F 16/3329 |
| 2025/0200399 A1* | 6/2025 | Stephan | G06N 5/04 |

* cited by examiner

*Primary Examiner* — Cam Linh T Nguyen
(74) *Attorney, Agent, or Firm* — Esplin & Associates, PC (57) ABSTRACT

Systems and methods for assessing consistency of interrogation responses with a record of facts in a legal proceeding. Exemplary implementations may: store embedded case content including vector space representations of case content associated with individual cases; obtain captured audio; determine a first inquiry provided to the first participant and a first response provided in response to the first inquiry based on the obtained audio; obtain vector space representations of case content associated with the first case; prompt a machine-learning model with instructions to generate a first vector space representation of the first inquiry, identify case content associated with the first case, and/or compare the identified case content associated with the first case and the first response to assess consistency of the first response with the identified case content associated with the first case; obtain outputs from the machine-learning model; provide the assessment of consistency and/or other exemplary implementations.

20 Claims, 3 Drawing Sheets

SYSTEMS AND METHODS FOR ASSESSING CONSISTENCY OF INTERROGATION RESPONSES WITH A RECORD OF FACTS

FIELD OF THE DISCLOSURE

The present disclosure relates to assessing consistency of information within a multi-party proceeding (e.g., a legal proceeding).

BACKGROUND

Large language models for text summarization and text generation are known. Retrieval augment generation (RAG) for enhancing large language models is known.

SUMMARY

Multi-party proceedings present numerous challenges, including the need to verify the consistency of responses against a factual record. This task becomes particularly difficult and time-consuming when dealing with extensive records, making real-time verification a challenge. To address this, machine-learning models be employed to analyze and cross-reference responses with the factual record efficiently. These models can identify inconsistencies and streamline the verification process, reducing the burden on human reviewers.

One or more aspects of the present disclosure include a system for assessing consistency of interrogation responses with a record of facts in a legal proceeding. The system may include electronic storage, one or more hardware processors configured by machine-readable instructions, and/or other components. Executing the machine-readable instructions may cause the one or more hardware processors to facilitate assessing consistency of interrogation responses with a record of facts in a legal proceeding. The machine-readable instructions may include one or more computer program components. The one or more computer program components may include one or more of a capture component, a case content component, a model component, an assessment component, and/or other components.

The electronic storage may store embedded case content and/or other information. The embedded case content may include vector space representations of case content associated with individual cases and/or vector space representations of other information. Vector space adjacency of the vector space representations may indicate semantic adjacency of the corresponding case content.

The capture component may be configured to obtain audio captured by an audio capture device during a legal proceeding. The obtained audio may be associated with a first case and/or may involve a first participant.

The capture component may be configured to determine a first inquiry provided to the first participant, a first response provided by the first participant in response to the first inquiry, and/or other information. The determination may be based on the obtained audio.

The case content component may be configured to obtain vector space representations of case content associated with the first case from the electronic storage.

The model component may be configured to prompt a machine-learning model with instructions that cause the machine-learning model to: generate a first vector space representation of the first inquiry; identify case content associated with the first case; and/or compare the identified case content associated with the first case and the first response. The identified case content associated with the first case may be semantically adjacent to the first inquiry based on vector space adjacency of the vector space representations of the identified case content associated with the first case and the first vector space representation. The comparison may be to assess consistency of the first response with the identified case content associated with the first case.

The model component may be configured to obtain outputs from the machine-learning model generated based on the provided inputs. The outputs may provide an assessment of consistency between the identified case content associated with the first case and the first response and/or other information.

The assessment component may be configured to provide the assessment of consistency to a user contemporaneously with the obtainment of the audio.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
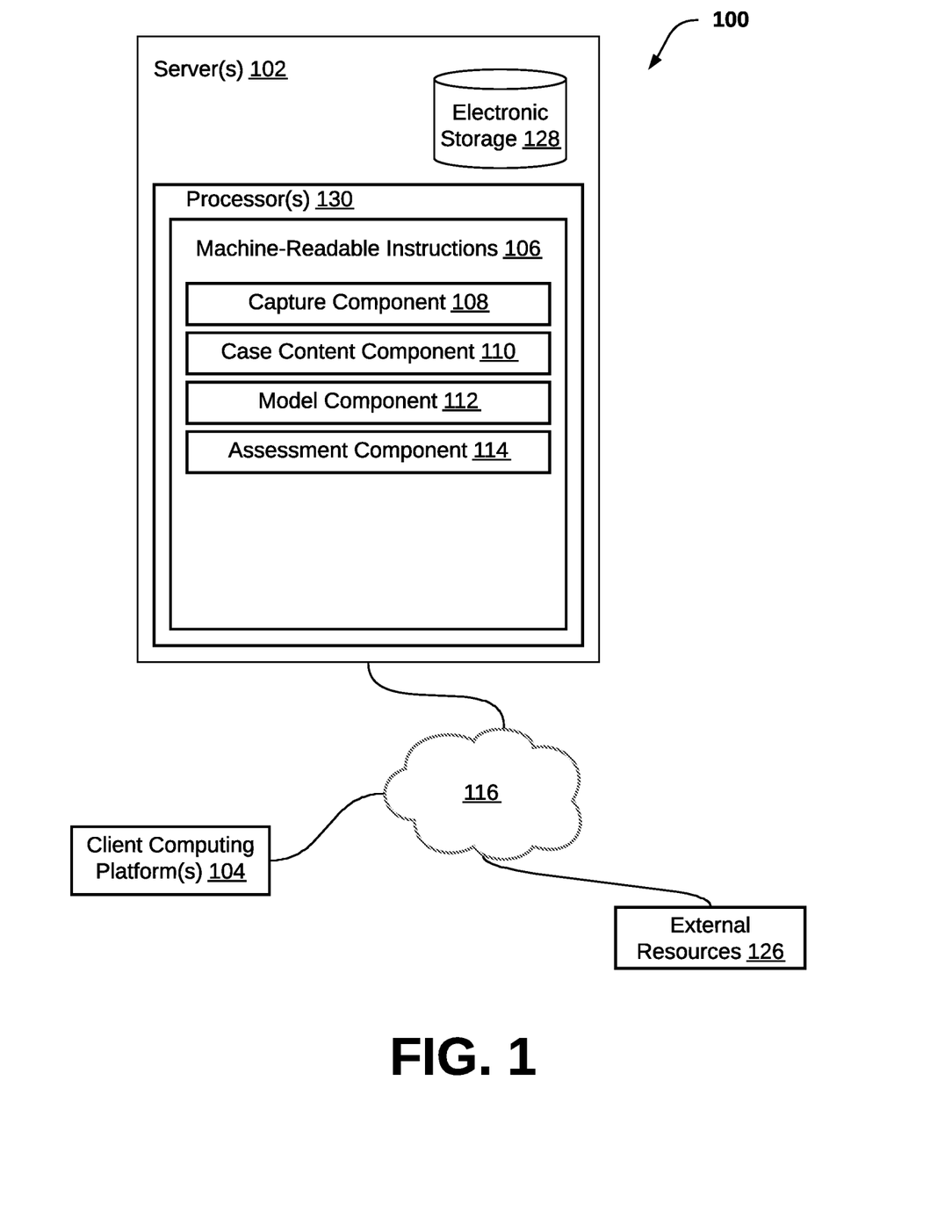
FIG. 1 illustrates a system for assessing consistency of interrogation responses with a record of facts, in accordance with one or more implementations.

FIG. 1 illustrates a system 100 configured for assessing consistency of interrogation responses with a record of facts in a legal proceeding, in accordance with one or more implementations. In some implementations, system 100 may include one or more server(s) 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Executing the machine-readable instructions 106 may cause server(s) 102 to facilitate assessing consistency of interrogation responses with a record of facts. Machine-readable instructions 106 may include one or more instruction components. The instruction components may include computer program components. The instruction components may include one or more of capture component 108, case content component 110, model component 112, assessment component 114, and/or other instruction components.

Electronic storage 128 may be configured to store embedded case content and/or other information. Case content may include factual information, legal information, and/or other types of information. The factual information may include information derived from case content associated with individual ones of the cases, information acquired from users associated with individual ones of the cases, and/or other types of information. By way of non-limiting illustration, case content may include deposition transcripts, deposition recordings, police reports, written witness statements, emails, and/or other types of content. Content may describe facts of the underlying case (e.g., details of incidents associated with individual ones of the cases), procedural details (e.g., document filings, filing dates, court dates, etc.), and/or other information. The legal information may include legal principles, legal theories, case law relevant to individual ones of the cases, and/or information. By way of non-limiting illustration, relevant case law for an individual case may include one or more cases having similar facts, the same jurisdiction, and/or other similarities to the individual case. In some implementations, case content may be obtained from a managed document repository (i.e., case management system).

The embedded case content may include vector space representations of case content associated with individual cases. The vector space representations of case content may be mathematical vectors indicating locations within a high dimensional space (i.e., vector space). In some implementations, an individual item of case content may be embedded into a number of vector space representations. By way of non-limiting illustration, an individual item of case content may be a deposition transcript. The deposition transcript may be embedded into 10, 100, 1,000, 10,000, and/or other vector space representations. Individual vector space representations may correspond with individual portions of the deposition transcript. The individual portions may be individual sentences, phrases, and/or other types of portions. In some implementations, the vector space representations may be linked and/or be associated with provenance information that indicates the portion of case content embedded by the vector space representation. By way of non-limiting illustration, provenance information may indicate an item of case content, a line of text included in the item of case content, a paragraph of text included in the item of case content, and/or other information.

In some implementations, the items of case content may be embedded using one or more models for embedding and/or otherwise processing natural language. By way of non-limiting illustration, the models may include one or more of a Doc2Vec model, a bag-of-words (BoW) model, a term frequency-inverse document frequency (TF-IDF) model, and/or other types of embedding models. The one or more models may be stored in electronic storage 128 and/or obtained via external resources 126. In some implementations, the embedding models may be fine-tuned using new case content to improve accuracy and relevance of the models. In some implementations, the embedding models may be augmented with performance of preprocessing techniques on the items of case content. The preprocessing techniques may include tokenization, stemming, lemmatization, stop-word removal, and/or other types of techniques. The preprocessing techniques may be used to enhance the quality of the vector space representations of the items of case content.

Vector space adjacency of the vector space representations may indicate semantic adjacency of the corresponding case content. Semantic adjacency between two or more portions of case content may indicate the two or portions having similar to related meaning. In some implementations, semantic adjacency between two or more portions of case content may be based on the given context of the individual portions within the individual items of case content. In some implementations, the case content may include responses corresponding to inquiries. The responses may have been previously provided by participants in response to the corresponding inquiries. By way of non-limiting illustration, semantic adjacency between two or more responses may be based in part on the inquiries corresponding to the inquiries.

In some implementations, different models may be utilized at different stages of the system 100. In some implementations, a machine-learning model may utilize one or more of an artificial neural network, naïve Bayes classifier algorithm, k-means clustering algorithm, support vector machine algorithm, linear regression, logistic regression, decision tree-based model, random forest, nearest neighbors, matrix factorization (e.g., a class of a class of collaborative filtering algorithms), classifier model, a histogram-based model, and/or other approaches.

Capture component 108 may be configured to obtain audio captured by an audio capture device during a legal proceeding. The audio capture device may include one or more of a microphone, digital audio recorders, and/or other types of audio capture devices. The audio capture device may be coupled with a client computing platform 104 and/or other devices. The audio capture device may be built into and/or embedded within the client computing platform 104. In some implementations, the audio capture device may be configured to send captured audio to capture component 108 via one or more networks 116.

In some implementations, the obtained audio may be associated with one or more cases including first case. The obtained audio being associated with the first case may indicate the proceeding is conducted as part of the first case. The proceeding may be a one or more of multi-party proceeding, an adversarial proceeding, and/or other types of legal proceedings. By way of non-limiting illustration, the proceeding may be a hearing, a deposition, conference (e.g., settlement conference, estate distribution conference, etc.). The obtained audio may involve one or more participants of the legal proceeding. The one or more participants may include a first participant, a second participant, and/or other participants. In some implementations, capture component 108 may be configured to analyze the obtained audio to identify individual participants and/or determine portions of the audio associated with the individual participants.

In some implementations, capture component 108 may be configured to provide the obtained audio to one or more trained machine-learning models configured to generated transcribed text based on provided audio input. The one or more trained machine-learning models may utilize one or more of automatic speech recognition (ASR) techniques (e.g., deep neural networks, recurrent neural networks, etc.) and/or other techniques to generated transcriptions of inputted audio. The transcribed text may specify participants associated with specific portions of transcribed audio, and/or other information. The transcribed text may be indexed using key words, timestamps, and/or other markers. The transcribed text may be stored in electronic storage 128.

Capture component 108 may be configured to determine a first inquiry provided to the first participant, a first response provided by the first participant in response to the first inquiry, and/or other inquiries and/or responses. In some implementations, capture component 108 may be configured to determine a set of inquiries and corresponding responses based on the obtained audio, transcribed text based on the obtained audio, and/or other information. The first inquiry and/or the first response may be included in the set of inquiries and corresponding responses. In some implementations, the first inquiry may be provided to the first participant by a second participant. The determination may be based on the obtained audio, transcribed text based on the obtained audio, and/or other information. The first inquiry may specify a request for information from the first participant, a request for confirmation of factual information from the first participant, and/or other types of requests. In some implementations, capture component 108 may be configured to determine a first statement provided by the first participant. The first statement may be unprompted by another participant or in response to another statement provided by another participant.

Determining the first inquiry, the first response, and/or other inquiries and/or responses may include embedding the first inquiry and the first response. Embedding the first inquiry and the first response may generate one or more of a vector space representation of the first inquiry, a vector space representation of the first response, and/or other embeddings. Capture component 108 may utilize the same or similar methods for embedding case content to embed inquiries, response, statements, and/or other content based on the obtained audio. By way of non-limiting illustration, capture component 108 may be configured to provide the first inquiry, the first response, and/or other information as input to a trained model configured to generate vector space representations based on provided inputs. The trained model may be configured to generate outputs based on the provided inputs. The outputs may include a first vector space representation of the first inquiry, a second vector space representation of the first response, and/or other information.

Case content component 110 may be configured to obtain vector space representations of case content from the electronic storage 128. In some implementations, case content component 110 may be configured to obtain vector space representations of case content associated with the first case and/or other cases. In some implementations, case content component 110 may be configured to obtain vector space representations of case content based on the first response, the first inquiry, and/or other information. By way of non-limiting illustration, case content component 110 may be configured to obtain vector space representations of case content based on the first response. Vector space representations of case content may be obtained based on proximity of the individual ones of the vector space representations to the first vector space representation of the first response within vector space. The proximity may be preselected by a user (e.g., via client computing platform(s) 104) and/or pre-determined by the system 100.

Model component 112 may be configured to prompt one or more trained machine-learning model with instructions that cause the machine-learning model to: generate a first vector space representation of the first inquiry; identify case content associated with the first case semantically adjacent to the first inquiry; and/or compare the identified case content associated with the first case and the first response. The same and/or similar methods used to embed case content may be used to generate the first vector space representation. Prompting may include providing one or more of the first inquiry, the first response, obtained vector space representations of case content associated with the first case, and/or other information as input to the one or more trained machine-learning models. In some implementations, the first inquiry and the first response may be provided as input and/or the one or more training machine-learning models may be configured to obtain the vector space representations of case content associated with the first case from electronic storage 128.

The one or more models may be prompted to identify case content associated with the first case that is semantically adjacent to the first inquiry. The semantic adjacency may be based on vector space adjacency between individual vector space representations of the one or more inquiries and the first vector space representation. The vector space adjacency of an individual vector space representation of the identified case content associated with the first case and the first vector space representation may indicate the distance within vector space between the individual vector space representation and the first vector space representation meets or is below a threshold distance. In some implementations, the threshold distance between vector space representations to indicate semantic adjacency may be adjusted based on the retraining and/or refining of the trained machine-learning models used to embed content. For example, the threshold distance between the vector space representations may be reduced as the machine-learning model(s) for embedding content become more accurate at capturing and embedding semantic relationships.

In some implementations, identifying case content associated with the first case that is semantically adjacent to the first inquiry may include identifying portions of case content. The portions of case content may include inquiries within case content, responses corresponding with the inquiries within case content, and/or other portions of case content. By way of non-limiting illustration, a second inquiry and a second response within an item of case content may be identified. The second inquiry may be identified based on vector space adjacency between a vector space representation of the second inquiry and the first vector space representation of the first inquiry. In some implementations, individual portions and/or items of case content may be identified based on a correspondence with one or more other identified portions and/or items of case content. By way of non-limiting illustration. The second response may be identified based on one or more of the identification of the second inquiry and/or the second response corresponding with the second inquiry.

In some implementations, the one or more models may be prompted to identify case content associated with the first case that is semantically adjacent to the first inquiry based on one or more criteria. The one or more criteria may be selected and/or provide by one or more users (e.g., via the one or more client computing platform(s) 104). By way of non-limiting illustration, the criteria may indicate a range of dates such that only case content associated with the first case and falling within the range of dates is identified. The criteria may specify the first participant such that only case content associated with the first participant is identified. It is to be expressly understood, however, that the criteria described herein are for the purpose of illustration only and are not intended to be limiting.

In some implementations, the one or more models may be prompted to identify levels of semantic adjacency corresponding with the identified case content associated with the first case and semantically adjacent to the first inquiry. By way of non-limiting illustration, the levels of adjacency may be low, moderate, high, and/or other levels. A low level may indicate minimal semantic similarity between a given item of case content (or a portion thereof) and the first inquiry. Conversely, a high level may indicate a strong semantic similarity between the given item of case content (or a portion thereof) and the first inquiry. In other words, the meaning and/or context of the given item of case content (or a portion thereof) and the first inquiry is the same or similar.

In some implementations, the model may be prompted to compare the identified case content associated with the first case and the first response. The comparison may be to assess consistency of the first response with the identified case content associated with the first case. In some implementations, comparing the identified case content associated with the first case and the first response may include comparing the identified responses and the first response. By way of non-limiting illustration, distances in vector space between individual vector space representations of the identified responses and a vector space representation of the first response may be determined. Consistency between the identified responses and the first response may be based on the determined distances in vector space.

The one or more models may include natural language processing models. The one or more models may be large language models (LLMs), small language models (SLM), and/or other types of machine-learning models for language analysis, generation, and/or understanding. Training of one or more models may be based on one or more of deep learning, supervised learning, semi-supervised learning, unsupervised learning, reinforcement learning, low-code techniques, and/or other techniques. In supervised learning, the model may be provided with a known training dataset that includes desired inputs and outputs, and the model may be configured to find a method to determine how to arrive at those outputs based on the inputs. By way of non-limiting illustration, in order to output assessments of consistency, a model may be trained with training input information comprising one or more of audio content and case content for individual cases, and training output information comprising human generated and/or model generated assessments of consistency. The model may identify patterns in information, learn from observations, and/or make predictions. The model may make predictions and may be corrected by an operator—this process may continue until the model achieves a desired level of accuracy/performance. Supervised learning may utilize approaches including one or more of classification, regression, forecasting, and/or other approaches.

Semi-supervised learning may be similar to supervised learning, but instead uses both labelled and unlabeled data. Labelled data may comprise information that has meaningful tags so that the model can understand the data, while unlabeled data may lack that information. By using this combination, the machine-learning model may learn to label unlabeled data.

For unsupervised learning, the machine-learning model may study information to identify patterns. There may be no answer key or human operator to provide instruction. Instead, the model may determine the correlations and relationships by analyzing available information. In an unsupervised learning process, the machine-learning model may be left to interpret large information sets and address that information accordingly. The model may try to organize that information in some way to describe its structure. This might mean grouping the information into clusters or arranging it in a way that looks more organized. Unsupervised learning may use techniques such as clustering and/or dimension reduction.

Reinforcement learning may focus on regimented learning processes, where the machine-learning model may be provided with a set of actions, parameters, and/or end values (e.g., the desired outputs). By defining the rules, the machine-learning model then tries to explore different options and possibilities, monitoring and evaluating each result to determine which one is optimal to generate correspondences. Reinforcement learning teaches the model trial and error. The model may learn from past experiences and adapt its approach in response to the situation to achieve the best possible result Model component 112 may be configured to obtain outputs from the machine-learning model generated based on the provided inputs. The outputs may provide an assessment of consistency between the identified case content associated with the first case and the first response and/or other information. In some implementations, the assessment of consistency may include a level of consistency between the identified case content associated with the first case and the first response. The level of consistency may be low consistency, moderate consistency, high consistency, and/or other levels of consistency. The level of consistency may indicate a level of semantic adjacency between the first response and the identified case content associated with the first case.

Assessment component 114 may be configured to provide the assessment of consistency to a user contemporaneously with the obtainment of the audio. The assessment of consistency may be provided on a user interface of a client computing platform 104 associated with the user. By way of non-limiting illustration, the assessment of consistency may be provided immediately after and/or nearly after the first response is captured by the audio capture device. In some implementations, the assessment of consistency may be generated to provide real-time feedback during the proceeding. The assessment of consistency may be generated within milliseconds to seconds of the audio capture and/or obtainment of captured audio.

In some implementations, a notification may be generated and/or provided to the user responsive to the assessment of consistency indicating an inconsistency between the first response and the identified case content. The notification may be provided via the client computing platform 104 associated with the user immediately after and/or nearly immediately after the first response is provided by the first participant and/or the first response is captured by the audio capture device. The notification may be one or more of an audio notification, a visual notification, a haptic notification (e.g., vibration), and/or other types of notifications. By way of non-limiting illustration, the visual notification may be a pop-up and or flag alert. The notification may display the item and/or portion of case content inconsistent with the first response. By way of non-limiting illustration, a first notification may be provided indicating the first response to the first inquiry is inconsistent with a second response to a second inquiry included in an item of case content. The first inquiry and the second inquiry may be the same and/or similar. The notification may include display of the second inquiry and/or the second response. In some implementation, the notification may include a link to the item of content including the second inquiry and/or the second response.

Figure 3:
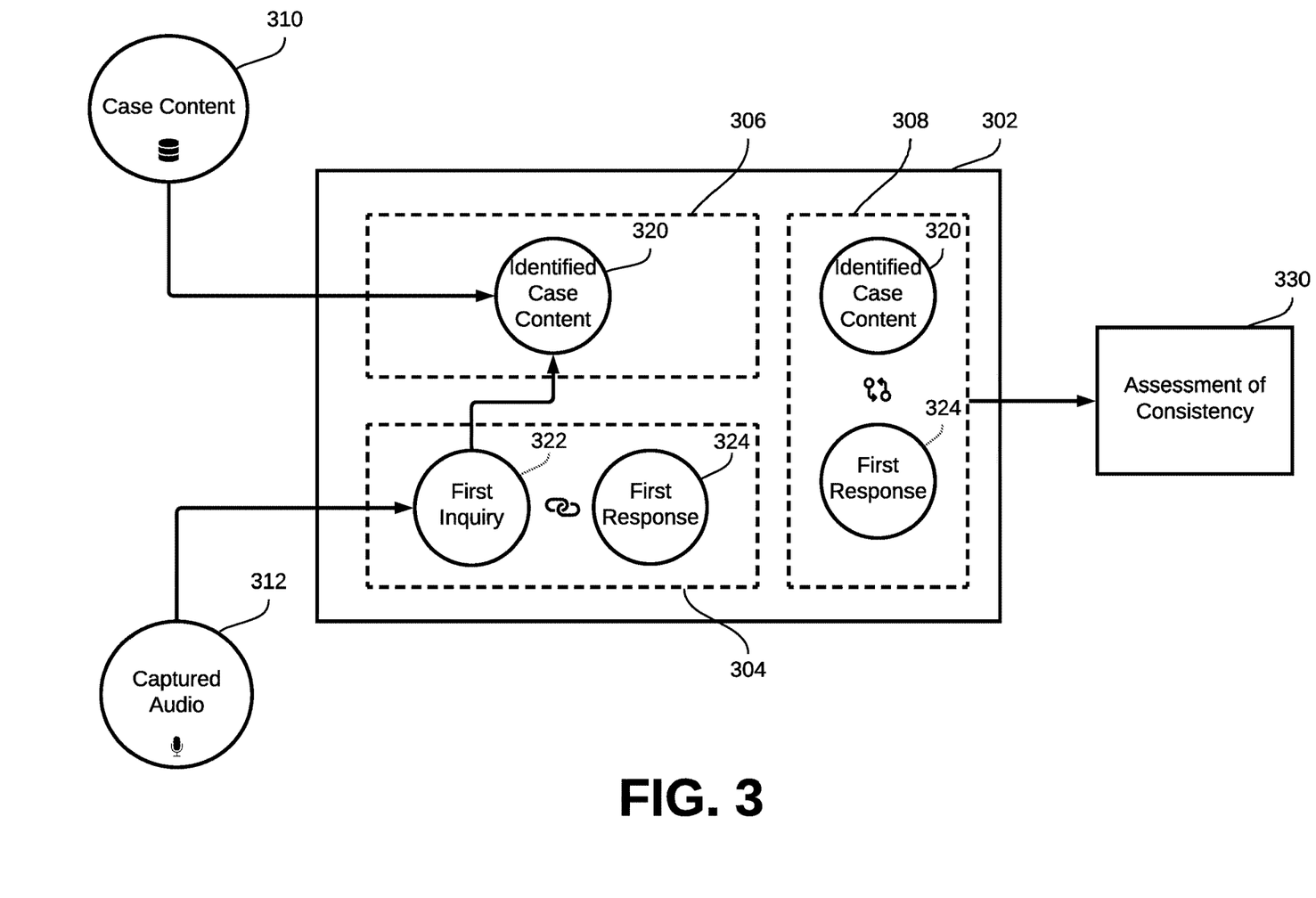
FIG. 3 illustrates an exemplary implementation of a system for assessing consistency of interrogation responses with a record of facts, in accordance with one or more implementations.

FIG. 3 illustrates an exemplary implementation of a system for assessing consistency of interrogation responses with a record of facts in a legal proceeding (the same as or similar to system 100 depicted in FIG. 1), in accordance with one or more implementations. For example, case content 310, captured audio 312, and/or other information may be provided as input to one or more models 302. The one or more models 302 may be prompted to perform one or more operations (indicated by the dashed boxes). The operations may include a first operation 304, a second operation 306, a third operation 308, and/or other operations. The first operation 304 may include identifying, based on captured audio 312, a first inquiry 322, a first response 324, and/or other information included in captured audio 312. The first response 324 may be provided by a first participant in response to the first inquiry 322. In some implementations, identifying the first inquiry 322 and the first response 324 may include embedding the first inquiry 322 and the first response 324. The second operation 306 may include identifying case content associated with the first case. The identified case content 320 may be identified based on semantic adjacency to the first inquiry 322. The semantic adjacency between the identified case content 320 and the first inquiry 322 may be based on vector space adjacency between vector space representations of the identified case content 320 and a vector space representation of the first inquiry 322. The third operation 308 may include analyzing the identified case content 320 and the first response 324 for consistency. Analyzing the identified case content 320 and the first response 324 for consistency may include comparing vector space representations of the identified case content 320 and a vector space representation of the first response 324. The one or more models may be configured to generate and output an assessment of consistency 330 based on the analysis.

In some implementations, server(s) 102, client computing platform(s) 104, and/or external resources 126 may be operatively linked via one or more electronic communication links. For example, such electronic communication links may be established, at least in part, via a network 118 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user corresponding to the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 118 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
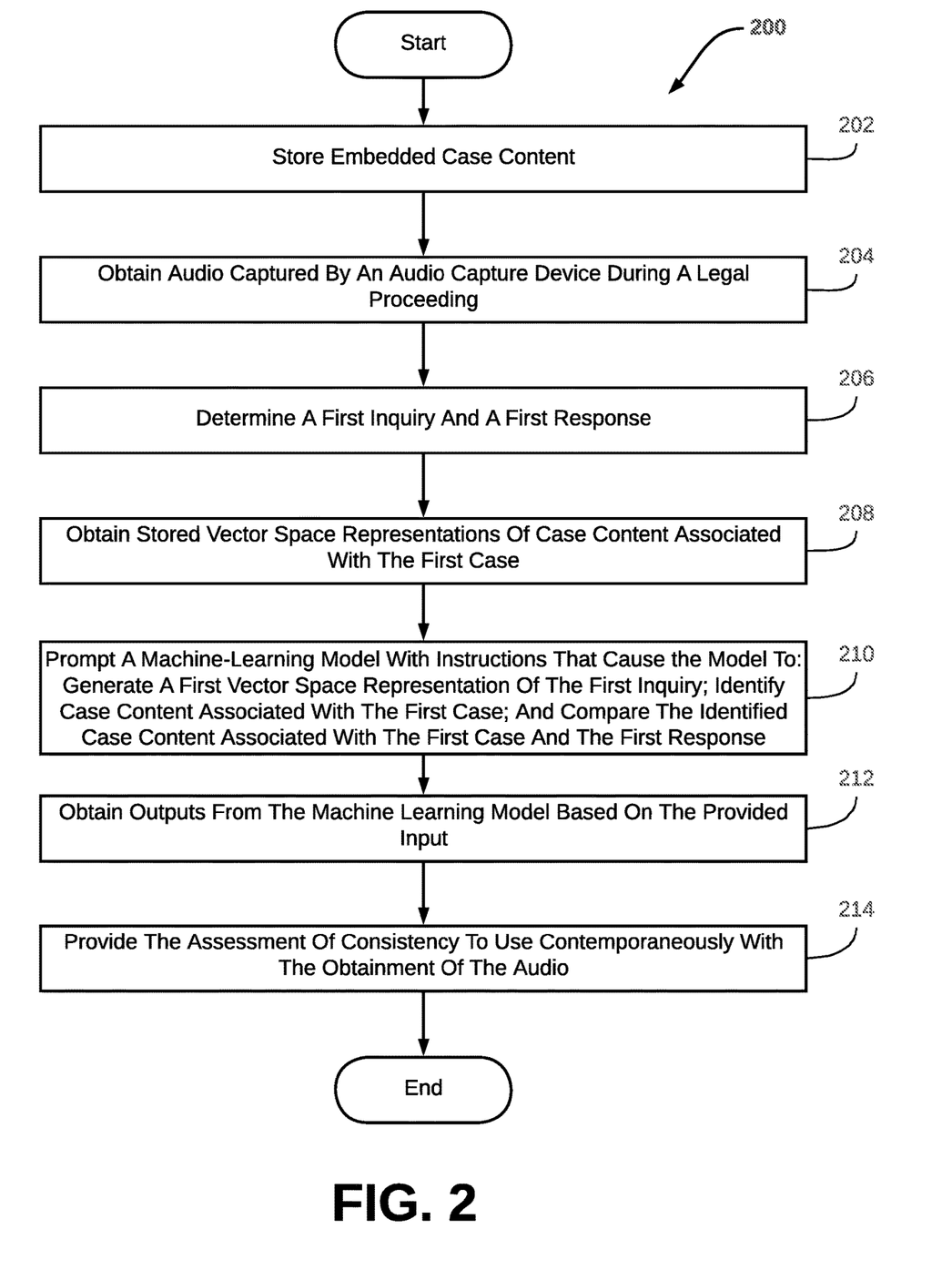
FIG. 2 illustrates a method for assessing consistency of interrogation responses with a record of facts, in accordance with one or more implementations.

FIG. 2 illustrates a method 200 for assessing consistency of interrogation responses with a record of facts in a legal proceeding, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing embedded case content and/or other information. The embedded case content may include vector space representations of case content associated with individual cases and/or vector space representations of other information. Vector space adjacency of the vector space representations may indicate semantic adjacency of the corresponding case content. Operation 202 may be performed by one or more computer components including a component that is the same as or similar to electronic storage 128, in accordance with one or more implementations.

An operation 204 may include obtaining audio captured by an audio capture device during a legal proceeding. The obtained audio may be associated with a first case and/or may involve a first participant. Operation 204 may be performed by one or more hardware processors configured by machine-readable instructions including a component that is the same as or similar to capture component 108, in accordance with one or more implementations.

An operation 206 may include determining a first inquiry provided to the first participant, a first response provided by the first participant in response to the first inquiry, and/or other information. The determination may be based on the obtained audio. Operation 206 may be performed by one or more hardware processors configured by machine-readable instructions including a component that is the same as or similar to capture component 108, in accordance with one or more implementations.

An operation 208 may include obtaining stored vector space representations of case content associated with the first case. Operation 208 may be performed by one or more hardware processors configured by machine-readable instructions including a component that is the same as or similar to case content component 110, in accordance with one or more implementations.

An operation 210 may include prompting a machine-learning model with instructions that cause the machine learning model to: generate a first vector space representation of the first inquiry; identify case content associated with the first case; and/or compare the identified case content associated with the first case and the first response. The identified case content associated with the first case may be semantically adjacent to the first inquiry based on vector space adjacency of the vector space representations of the identified case content associated with the first case and the first vector space representation. The comparison may be to assess consistency of the first response with the identified case content associated with the first case. Operation 210 may be performed by one or more hardware processors configured by machine-readable instructions including a component that is the same as or similar to model component 112, in accordance with one or more implementations.

An operation 212 may include obtaining outputs from the machine-learning model generated based on the provided inputs. The outputs may provide an assessment of consistency between the identified case content associated with the first case and the first response and/or other information. Operation 212 may be performed by one or more hardware processors configured by machine-readable instructions including a component that is the same as or similar to model component 112, in accordance with one or more implementations.

An operation 214 may include providing the assessment of consistency to a use contemporaneously with the obtainment of the audio. Operation 214 may be performed by one or more hardware processors configured by machine-readable instructions including a component that is the same as or similar to assessment component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to assess consistency of interrogation responses with a record of facts in a legal proceeding, the system comprising:
   electronic storage that stores embedded case content, wherein the embedded case content includes vector space representations of case content associated with individual cases, and wherein vector space adjacency of the vector space representations indicates semantic adjacency of the corresponding case content;
   one or more physical processors configured by machine-readable instructions to:
      obtain audio captured by an audio capture device during a legal proceeding associated with a first case and involving a first participant;

determine, based on the obtained audio, a first inquiry provided to the first participant and a first response provided by the first participant in response to the first inquiry;

obtain vector space representations of case content associated with the first case from the electronic storage;

prompt a machine-learning model with instructions that cause the machine-learning model to:

generate a first vector space representation of the first inquiry;

identify case content associated with the first case that is semantically adjacent to the first inquiry based on vector space adjacency of the vector space representations of the identified case content associated with the first case and the first vector space representation; and compare the identified case content associated with the first case and the first response to assess consistency of the first response with the identified case content associated with the first case;

obtain outputs from the machine-learning model generated based on the provided inputs, wherein the outputs provide an assessment of consistency between the identified case content associated the first case and the first response; and provide the assessment of consistency to a user contemporaneously with the obtainment of the audio.

2. The system of claim 1, wherein the vector space adjacency of an individual vector space representation of the identified case content associated with the first case and the first vector space representation indicates the distance within vector space between the individual vector space representation and the first vector space representation meets or is below a threshold distance.

3. The system of claim 1, wherein the assessment of consistency includes a level of consistency between the identified case content associated with the first case and the first response is based on individual distances within vector space between the vector space representation of the first response and the vector space representations of the identified case content associated with the first case.

4. The system of claim 3, wherein the level of consistency is low consistency, moderate consistency, and high consistency, and wherein the level of consistency indicates a level of semantic adjacency between the first response and the identified case content associated with the first case.

5. The system of claim 1, wherein the assessment of consistency indicates one or more inconsistencies between the first response and the identified case content associated with the first case, and wherein the assessment of consistency includes one or more references to individual items of case content that are inconsistent with the first response.

6. The system of claim 1, wherein the case content includes responses corresponding to inquiries, the responses being previously provided by participants in response to the corresponding inquiries.

7. The system of claim 6, wherein the identified case content associated with the first case includes responses previously provided by the first participant.

8. The system of claim 7, wherein identifying case content associated with the first case that is semantically adjacent to the first inquiry includes:

identifying one or more inquiries included in the case content associated with the first case that are semantically adjacent to the first inquiry, wherein the semantic adjacency is based on vector space adjacency between individual vector space representations of the one or more inquiries and the first vector space representation;

identifying responses provided in response to the one or more identified inquiries, wherein the identified responses are included in the case content associated with the first case.

9. The system of claim 8, wherein comparing the identified case content associated with the first case and the first response includes comparing the identified responses included in the case content and the first response.

10. The system of claim 8, wherein semantic adjacency between the one or more identified inquiries and the first inquiry indicates the first inquiry is similar to or the same as the one or more identified inquiries.

11. A method for assessing consistency of interrogation responses with a record of facts in a legal proceeding, the method comprising:

storing embedded case content, wherein the embedded case content includes vector space representations of case content associated with individual cases, and wherein vector space adjacency of the vector space representations indicates semantic adjacency of the corresponding case content;

obtaining audio captured by an audio capture device during a legal proceeding associated with a first case and involving a first participant;

determining, based on the obtained audio, a first inquiry provided to the first participant and a first response provided by the first participant in response to the first inquiry;

obtaining stored vector space representations of case content associated with the first case;

prompting a machine-learning model with instructions that cause the machine-learning model to:

generate a first vector space representation of the first inquiry; identify case content associated with the first case that is semantically adjacent to the first inquiry based on vector space adjacency of the vector space representations of the identified case content associated with the first case and the first vector space representation; and compare the identified case content associated with the first case and the first response to assess consistency of the first response with the identified case content associated with the first case;

obtaining outputs from the machine-learning model generated based on the provided inputs, wherein the outputs provide an assessment of consistency between the identified case content associated the first case and the first response; and providing the assessment of consistency to a user contemporaneously with the obtainment of the audio.

12. The method of claim 11, wherein the vector space adjacency of an individual vector space representation of the identified case content associated with the first case and the first vector space representation indicates the distance within vector space between the individual vector space representation and the first vector space representation meets or is below a threshold distance.

13. The method of claim 11, wherein the assessment of consistency includes a level of consistency between the identified case content associated with the first case and the first response is based on individual distances within vector space between the vector space representation of the first response and the vector space representations of the identified case content associated with the first case.

14. The method of claim 13, wherein the level of consistency is low consistency, moderate consistency, and high consistency, and wherein the level of consistency indicates a level of semantic adjacency between the first response and the identified case content associated with the first case.

15. The method of claim 11, wherein the assessment of consistency indicates one or more inconsistencies between the first response and the identified case content associated with the first case, and wherein the assessment of consistency includes one or more references to individual items of case content that are inconsistent with the first response.

16. The method of claim 11, wherein the case content includes responses corresponding to inquiries, the responses being previously provided by participants in response to the corresponding inquiries.

17. The method of claim 16, wherein the identified case content associated with the first case includes responses previously provided by the first participant.

18. The method of claim 17, wherein identifying case content associated with the first case that is semantically adjacent to the first inquiry includes:

identifying one or more inquiries included in the case content associated with the first case that are semantically adjacent to the first inquiry, wherein the semantic adjacency is based on vector space adjacency between individual vector space representations of the one or more inquiries and the first vector space representation;

identifying responses provided in response to the one or more identified inquiries, wherein the identified responses are included in the case content associated with the first case.

19. The method of claim 18, wherein comparing the identified case content associated with the first case and the first response includes comparing the identified responses included in the case content and the first response.

20. The method of claim 18, wherein semantic adjacency between the one or more identified inquiries and the first inquiry indicates the first inquiry is similar to or the same as the one or more identified inquiries.

\* \* \* \* \*

UNITED STATES PATENT AND TRADEMARK OFFICE
CERTIFICATE OF CORRECTION

| | | |
|---|---|---|
| PATENT NO. | : 12,461,957 B1 | Page 1 of 1 |
| APPLICATION NO. | : 19/171518 | |
| DATED | : November 4, 2025 | |
| INVENTOR(S) | : Nathan Walter | |

It is certified that error appears in the above-identified patent and that said Letters Patent is hereby corrected as shown below:

On the Title Page

Assignee item (73), please replace "The Simple Associates, Inc." with --The Simple Associate, Inc.--, therefor.

Signed and Sealed this
Thirteenth Day of January, 2026

John A. Squires
*Director of the United States Patent and Trademark Office*